March 31, 1959     W. E. MYERS     2,879,885
POLE SAFETY DEVICE FOR DRY ROOM CONVEYOR
Filed Sept. 15. 1955     2 Sheets-Sheet 1
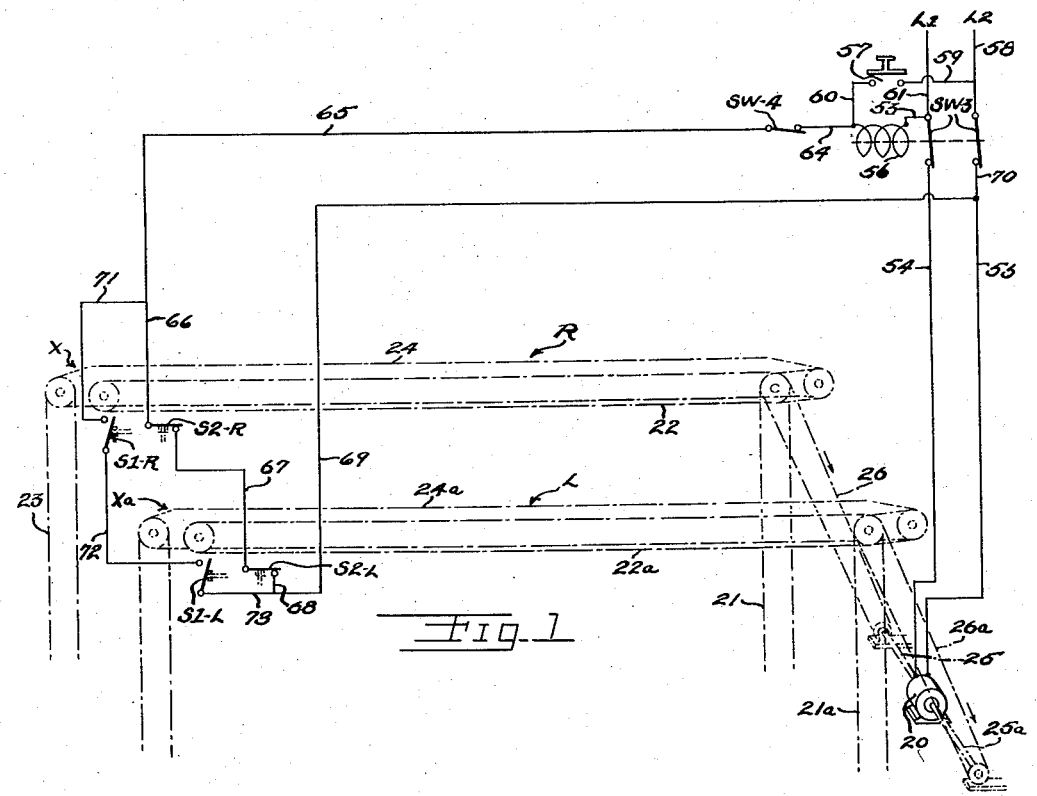
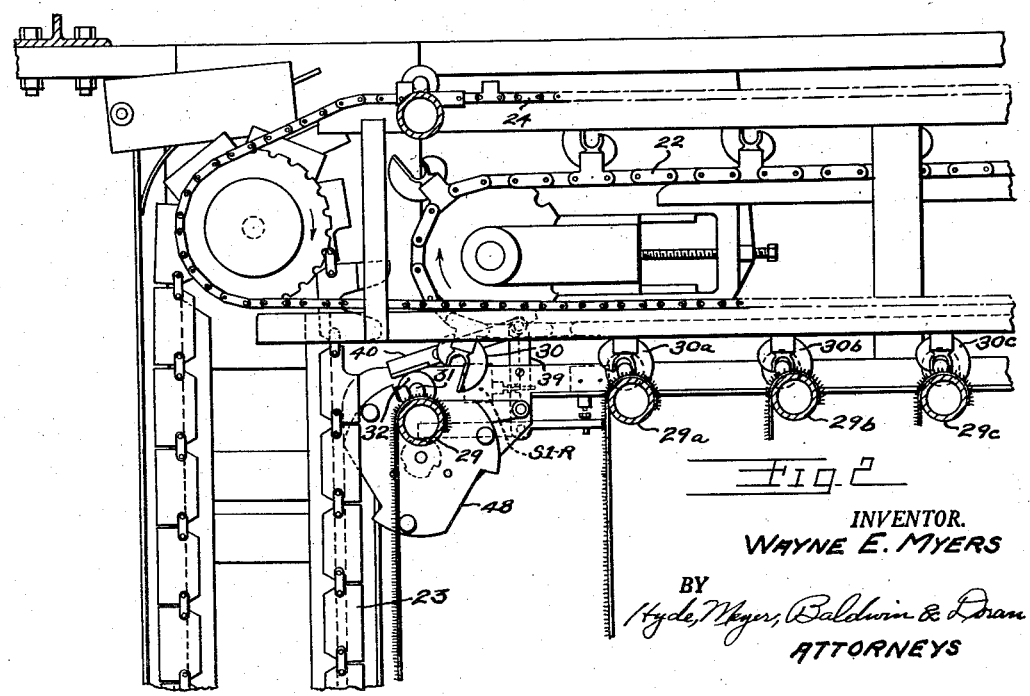
INVENTOR.
WAYNE E. MYERS
BY
*Hyde, Meyer, Baldwin & Doran*
ATTORNEYS March 31, 1959 W. E. MYERS 2,879,885
POLE SAFETY DEVICE FOR DRY ROOM CONVEYOR
Filed Sept. 15, 1955 2 Sheets-Sheet 2
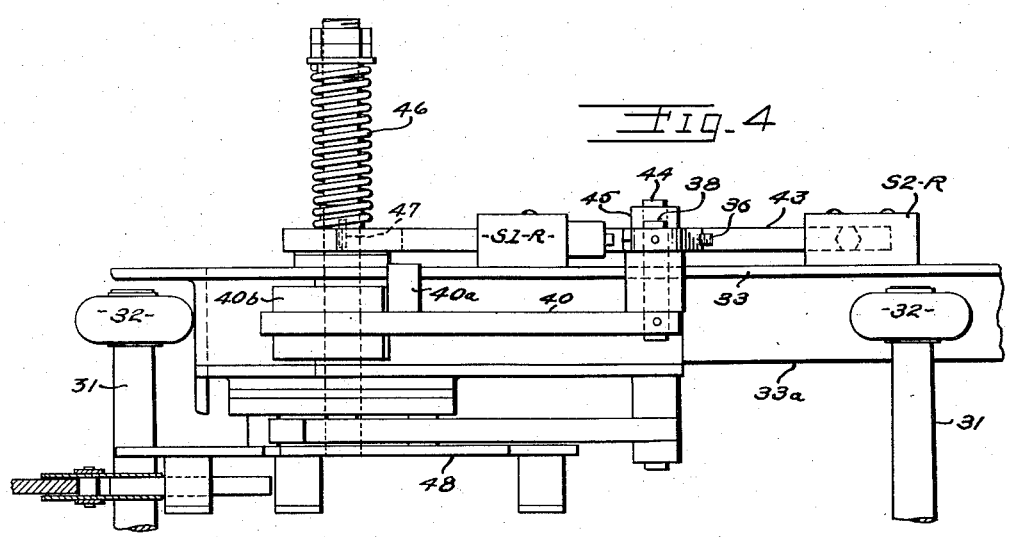
INVENTOR.
WAYNE E. MYERS
BY
Hyde, Meyer, Baldwin & Doran
ATTORNEYS

United States Patent Office 2,879,885
Patented Mar. 31, 1959

2,879,885

POLE SAFETY DEVICE FOR DRY ROOM CONVEYOR

Wayne E. Myers, Cincinnati, Ohio, assignor to The American Laundry Machinery Company, Cincinnati, Ohio, a corporation of Ohio Application September 15, 1955, Serial No. 534,505

13 Claims. (Cl. 198—232)

This invention relates to a safety device for a rug dry room conveyor, for example a conveyor of the general character shown in my copending application Serial No. 509,714, filed May 20, 1955.

In the conveyor disclosed in said co-pending application, a continuous series of rugs are suspended from respective rug-carrying poles on a generally vertical, ascending loading conveyor, automatically transferred from the top of the loading conveyor to a generally horizontal drying conveyor whereby the poles are carried away from said loading conveyor and at relatively slow speed, and eventually automatically transferred from said drying conveyor to the top end of a descending, generally vertical unloading conveyor at the lower end of which the rugs are detached from the poles.

The drying conveyor is necessarily placed high enough above the dry room floor to allow ample working clearance from said floor for the lower edge of the hanging article. There is some possibility that at the transfer zone between the drying conveyor and the unloading conveyor an imperfect co-function of the conveyor or transfer mechanism may cause one end of the pole to be displaced, whereupon the pole with its depending rug might become disengaged from the apparatus and might drop a substantial height to the floor, thereby possibly injuring an operator, damaging some of the apparatus, soiling the cleaned rug, etc.

An object of the present invention is to provide safety means which automatically brings all conveyors to a halt if either pole end is not in predetermined proper position when it enters and progresses through the transfer mechanism.

Other objects and advantages will be apparent from a study of the following description of one preferred embodiment of the invention in conjunction with the accompanying drawings, in which:

Fig. 1 is a schematic showing of a dry room conveyor system with a diagrammatic showing of the electric circuits and associated means comprising my safety device.

Fig. 2 is an elevational view of the delivery end of the right side conveyor frame where the transfer is made from the drying conveyor to the delivery conveyor.

Fig. 3 is an enlarged detail view taken in the same neighborhood as Fig. 2, but with some parts removed to better show operating structure.

Fig. 4 is a top plan view taken from above Fig. 3.

The complete structure and operation of the rug drying apparatus shown only schematically in Fig. 1 is fully shown and described in my aforesaid co-pending application, Serial No. 509,714, but it will be very briefly characterized here, still referring to Fig. 1, and more specifically to the lower half of Fig. 1. It comprises a right frame R and a left frame L, extending in upright, parallel, spaced relationship away from a driving motor 20. The frames have loading conveyors 21, 21a near the motor, drying conveyors 22, 22a extending horizontally away from the motor, and delivery conveyors 23, 23a at the opposite ends of the room from the motor. For convenience in Fig. 1 the frames are shown, in outline and in perspective fashion, vertically and laterally offset from each other, but actually corresponding parts of each frame are in the same horizontal and vertical planes, as though the frames were opposite side walls of a room. Each rug-carrying pole has at each end means for conveyance on the opposed conveyors, including a wheel at each end which usually rolls in contact with its conveyor frame, and each conveyor has impeller or carrier means to move the pole. A fourth pair of conveyors, 24 and 24a, is used to return empty poles to the loading end, but is not of interest here. The single motor 20, through extended shafts 25 and 25a drives belts 26, 26a to simultaneuosly drive all conveyors in both side frames. Obviously if the motor stops, all conveyors also stop. The present invention is directed towards stopping motor 20 if any pole fails to make a proper transfer or crossover from conveyors 22, 22a to conveyors 23, 23a, at the location generally indicated by the arrows X and Xa on Fig. 1. The X location is shown with necessary structural detail in Figs. 2, 3 and 4 to which I now refer.

These figures show the drying conveyor 22, the delivery conveyor 23, and the pole return conveyor 24. The rug-carrying poles 29, 29a, 29b, 29c are shown proceeding in spaced sequence from right to left in Fig. 2, urged on by respective carriers 30, 30a, 30b, 30c on the conveyor 22.

Each rug-carrying pole has at each end an axle extension, as at 31 in Figs. 3 and 4, receivable in the socket of the bifurcated carrier, and each such axle extension is provided with a wheel 32 which rolls on the horizontal flange 33a of the fixed angle frame 33 of the drying conveyor when the pole is being conveyed thereon.

As heretofore indicated, my safety device is adapted to produce stoppage of motor 20 if a pole fails to be properly transferred from conveyor 22 to conveyor 23. This is accomplished by providing suitable electrical circuits including a pair of electrical switches in spaced relationship along each side of the drying conveyor, which are operated in sequence by mechanism responsive to advance of a pole in predetermined and proper fashion. If the pole is "de-railed," at one end or the other, or does not move in the proper path, then the switches will not be operated in proper sequence, or one or other may not be operated at all, so that certain circuits required for continued operation of the motor will not be energized and the motor will stop, as will appear.

The structural arrangement and operation of the switches are identical on both sides. On the right side, as shown in Figs. 1, 3 and 4, I have provided the switches S1–R and S2–R. On the left side, shown only in the diagram of Fig. 4, are the corresponding switches S1–L and S2–L. Their significance, and the manner in which they are operated will be described hereinbelow, referring only to the right inside corner where the right side drying conveyor registers with the right side delivery conveyor, as shown in Figs. 2, 3 and 4.

Switches S1–R and S1–L are normally open, and switches S2–R and S2–L are normally closed. S1–R is adapted to be closed by a screw 36 adjustably fixed in the lower end of a lever arm 37. Arm 37 is fixed on a shaft 38 freely journalled in a bearing portion 39a of a bracket 39 secured to the flange 33 of the horizontal conveyor track frame. The other end of shaft 38 has fixed to it a lever arm 40 having a stop member 40a normally resting on the vertical track flange 33, and an end plate or shoe 40b engageable by an approaching pole roller 32. Thus, when a pole roller moves into transfer position, as indicated in Fig. 2, it raises lever 40 and thereby swings lever 37 clockwise, engaging and closing switch S1-R, and also S1-L on the other frame.

Switch S2-R is likewise mounted on track frame 3, and is adapted to be operated by a lever 43 freely pivoted on a stud shaft 44 on bracket 39, a set collar 45 holding the lever on the shaft. The lever arm portion to the left of the pivotal axis of shaft 44 is heavier, to provide the needed operating force, so as to actuate switch S2-R when the arm is released. Normally the end of the lever 43 rests on one of the high points of a cam 41 which is mounted on a shaft 46 by a slidable key 47 which rotates with the shaft, whereby cam 41 can have a slight axial movement on shaft 46 to take care of the spring pressed frictional mounting of index plate 48. The operation of the transfer index plate, and the associated mechanism, is quite thoroughly explained in my aforesaid co-pending application, Serial No. 509,714 and will be briefly touched on herein only to the extent necessary to fully understand the operation of the present invention.

As a pole is advanced by a carrier 30 (Figs. 2 and 3) on the horizontal conveyor 22, its end roller rides on track flange 33a. As the roller starts down the inclined portion 33b, the axle 31 leaves its engagement with the carrier finger and the pole rolls to a stop in contact with the upturned end of a latch lever 49. When a corresponding carrier 50 on the vertical unloading conveyor 23 contacts an adjacent roller 51 on the index plate 48, the plate is turned counterclockwise one hundred twenty degrees, carrying the pole axle around and engaging it in the crotch of the carrier thereby effecting the transfer to the unloading conveyor 23.

When the conveyors are in operation, motor 20 is energized through conductors 54, 55 (Fig. 1) from closed switch SW-3, this being held in closed position by its operating coil 56. This coil is energized, at the beginning of a production run, by a push button switch 57 which, when closed, completes a circuit from L$_2$ through conductors 58 and 59, closed switch 57, conductor 60, coil 56, and conductors 53 and 61 to L$_1$. This energizes the motor from L$_1$ through conductor 61, closed blade of switch SW-3, conductor 54, motor 20, conductor 55, closed blade of switch SW-3, and conductor 58 to L$_2$.

Closing of switch SW completes a maintaining circuit to coil 56, as follows: from L-1 through conductors 61 and 53, coil 56, conductor 64, a normally closed switch SW-4, conductors 65 and 66, normally closed switch S2-R, conductor 67, normally closed switch S2-L, conductors 68, 69 and 70, a closed blade of switch SW-3, and conductor 58 to L$_2$. The operator may then remove her finger from push button 57 since coil 56 is in the maintaining circuit just described, independent of the push button. It may therefore be noted that, for the time being, motor operation requires that switches S2-R and S1-R be closed. It may further be noted that there is a shunt circuit comprising conductor 71, normally open switch S1-R, conductor 72, normally open switch S1-L, and conductor 73. As will appear, if either one or both of the switches S2-R and S2-L are opened, the motor 20 will still run if both the switches S1-R and S1-L happen to be closed when either S1-R and S1-L are opened. The significance of this fact will immediately appear.

Fig. 3 and the diagram of Fig. 1 show the safety switches in idle, or unoperated condition, under which condition the motor is running because the maintaining circuit has been closed, and the conveyors 21, 22, 23 and 24 are running in respective predetermined directions. Now assume that a pole in correct normal alignment approaches the transfer point. The pole roller at each end of the pole contacts and raises its respective lever 40, Figs. 2 and 3. This closes switches S1-R and S1-L so as to close the shunt circuit mentioned in the last preceding paragraph. The longer finger of carrier 50 now contacts a roller 51 so as to rotate the index plate 48.

Almost immediately actuating lever 43 at its left end drops off the high point on cam 45 and its contacting finger 43a opens switch S2-R. Switch S2-L is similarly opened on the left side conveyor. Nothing happens because the shunt circuit through switches S1-R and S1-L is now closed by action of rollers 32 against levers 40, and this has closed switches S1-R and S1-L.

The drop in cam 41 is so contoured that lever 43 quickly moves clockwise again, permitting switch S2-R (and S2-L) to reclose. It thus happens that there has been no interruption of the current to the switch coil, and the pole is carried down the vertical conveyor.

If the pole becomes disengaged from one carrier, say on the right hand conveyor, then when the left hand roller engages its switch lever 40, switch S1-L closes but the right hand switch S1-R remains open, interrupting the secondary maintaining circuit. As previously indicated, the motor is still running because of the first maintaining circuit. Now when the delivery conveyor carriers begin to rotate index plate 48, switches S2-R and S2-L open, breaking the first maintaining circuit. Since the secondary circuit is open at S1-R, there is now no circuit to energize switch coil 56, and the drive motor stops. The operator immediately checks the source of the trouble, which may normally be presumed to be at the transfer point, and the pole is replaced in proper position and the motor is restarted with the pushbutton.

It might seem that the safety device hereinabove described would operate using only one "S2" switch, namely either S2-R or S2-L. This is true as long as the trouble is located adjacent the particular switch selected. The second switch of course serves a useful purpose with respect to trouble in its vicinity. If only one switch were used, then absolute certainty would not be achieved. Two switches are therefore preferred to assure reliable functioning.

What I claim is:

1. Safety control means for a rug-drying conveyor system of the type wherein rug-carrying means is advanced on a first conveyor towards a second conveyor, and thereafter transferred to said second conveyor, and wherein transfer means is provided for transferring said rug-carrying means from said first conveyor to said second conveyor at a transfer zone, said safety control means including, in combination, a motor for driving said conveyors, electric circuit means for said motor whereby to maintain said motor in motion when current is flowing in said electric circuit means, and first and second switch means disposed in parallel in respective shunt portions of said electric circuit means, the first said switch means being operatively responsive to passage of said rug-carrying means therepast, and the second said switch means being adapted to be automatically operated during the period in which the rug-carrying means, when in normal operating position is holding the first said switch operated, whereby, when said rug-carrying means is travelling in normal manner through said transfer zone, at least one of said switch means maintains the electric circuit means circuit closed so as to continually supply electric current to said motor, and means effective on said first and second switch means for causing an open circuit simultaneously in both said shunt circuits whenever said rug-carrying means is displaced from its predetermined path of travel through said transfer zone.

2. Safety control means for a rug-drying conveyor system of the type wherein rug-carrying means is advanced on a first conveyor towards a second conveyor, and thereafter transferred to said second conveyor, and wherein transfer means is provided for transferring said rug-carrying means from said first conveyor to said second conveyor at a transfer zone, said safety control means including, in combination, a motor for driving said conveyors, electric circuit means for said motor whereby to maintain said motor in motion when current is flowing in said electric circuit means, and first and second switch means disposed in parallel, each in a respective shunt portion of said electric circuit means, means responsive to passage therepast of said rug-carrying means and effective on said first switch means and the second said switch means being adapted to be automatically operated during the period in which the rug-carrying means, when in normal operating position, is holding the first said switch operated, whereby, when said rug-carrying means travels in normal manner through said transfer zone said electric circuit means maintains continuous current flow to said motor, but whereby current flow to said motor is interrupted whenever said rug-carrying means is displaced from its predetermined path of travel through said transfer zone.

3. Safety control means as defined in claim 2 wherein each said first and said second switch means consists of a pair of switches connected in series, one such pair being normally closed and the other such pair being normally open.

4. Safety control means as defined in claim 2 wherein each said first and said second switch means consists of a pair of switches connected in series, one such pair being normally closed and one such pair being normally open, and wherein said means responsive to passage therepast of said rug includes a member for closing said normally open switches temporarily, and another member for opening said normally closed switches temporarily within the period while the normally open switches are closed.

5. Safety control means for a rug-drying conveyor system of the type wherein rug-carrying means is advanced on a first conveyor towards a second conveyor, and thereafter transferred to said second conveyor, and wherein transfer means is provided for transferring said rug-carrying means from said first conveyor to said second conveyor at a transfer zone, said safety control means including, in combination, a motor for driving said conveyors, electric circuit means for said motor whereby to maintain said motor in motion when current is flowing in said electric circuit means, and a first and a second switch disposed in parallel in respective shunt portions of said electric circuit means, means responsive to passage therepast of said rug-carrying means, and effective on said first switch, and the second said switch means being adapted to be automatically operated during the period in which the rug-carrying means, when in normal operating position, is holding the first said switch operated, whereby, when said rug-carrying means travels in normal manner through said transfer zone, said electric circuit means maintains continuous current flow to said motor, but whereby current flow to said motor is interrupted whenever said rug-carrying means is displaced from its predetermined path of travel through said transfer zone.

6. Safety control means as defined in claim 2 wherein one said switch is normally closed and the other said switch is normally open.

7. Safety control means as defined in claim 5 wherein one said switch is normally closed and the other said switch is normally open, and wherein said means responsive to passage therepast of said rug includes a member for closing said normally open switch temporarily, and another member for opening said normally closed switch temporarily within the period while the normally open switch is closed.

8. Safety control means for a rug-drying conveyor system of the type wherein rug-carrying means is advanced on a first conveyor towards a second conveyor, and thereafter transferred to said second conveyor, and wherein transfer means is provided for transferring said rug-carrying means from said first conveyor to said second conveyor at a transfer zone, said safety control means including, in combination, a motor for driving said conveyors, electric circuit means for said motor whereby to maintain said motor in motion when current is flowing in said electric circuit means, and first and second switch means disposed each in a parallel portion of said electric circuit means, movable switch-operating means disposed adjacent to the path of travel of said rug-carrying means therepast, and effective on said first switch means and the second said switch means being adapted to be automatically operated during the period in which the rug-carrying means, when in normal operating position, is holding the first said switch operated, whereby, when said rug-carrying means travels in normal manner said switch operating means continuously permits one or other said switch means to remain closed, but whereby, when said rug-carrying means is displaced from its predetermined path of travel through said transfer zone, said switch-operating means causes both said switch means to be opened simultaneously so as to interrupt current flow to said motor.

9. Safety control means as defined in claim 8 wherein each said first and second switch means consists of a pair of switches connected in series in its parallel portion of the electric circuit means, one such pair being normally closed and the other such pair being normally open.

10. Safety control means as defined in claim 8 wherein each said first and said second switch means consists of a pair of switches connected in series in its parallel portion of the electric circuit means, one such pair being normally closed and the other such pair being normally open, and wherein said switch-operating means includes a member for closing said normally open switches temporarily, and another member for opening said normally closed switches temporarily within the period while the normally open switches are closed.

11. Safety control means for a rug-carrying conveyor system of the type wherein a rug-carrying pole is advanced on a first conveyor towards a second conveyor, and thereafter transferred to said second conveyor, and wherein transfer means is provided for transferring said rug-carrying pole from said first conveyor to said second conveyor at a transfer zone, said safety control means including, in combination, a motor for driving said conveyors, electric circuit means for said motor whereby to maintain said motor in motion when current is flowing in said electric circuit means, a first switch and a second switch in the path of travel of an end portion of said rug-carrying pole, and located adjacent said transfer zone, said switches being located in respective parallel branches of said electric circuit means whereby said circuit is energizable if one only of said switches is open, but de-energized if both said switches are open, a first switch operating means mounted adjacent the path of travel of said rug-carrying end portion and adapted to be actuated by said rug-carrying end portion, and effective upon said first switch, a second switch operating means mounted adjacent the path of travel of said rug-carrying end portion and adapted to be effective on said second switch, said second switch operating means being adapted to be automatically actuated during the period in which the rug-carrying means, when in normal position, is holding the first switch means operated said switches being so disposed in said parallel branches that when said rug-carrying means is displaced from its pre-determined path of travel through said transfer zone, said switch-operating means causes both said switches to be in open position at the same time so as to interrupt current flow to said motor.

12. Safety control means as defined in claim 11 wherein one said switch is normally closed and the other said switch is normally open.

13. Safety control means as defined in claim 11 wherein one said switch is normally closed and the other said switch is normally open and wherein said first and said second switch-operating means are so disposed with relation to their respective switches that when one opens the normally open switch temporarily the other closes the normally open switch to maintain continuous current flow in said circuit.

References Cited in the file of this patent

UNITED STATES PATENTS

| | | |
|---|---|---|
| 322,765 | Waldron | July 21, 1885 |
| 2,658,610 | Winslow | Nov. 10, 1953 |
| 2,724,482 | Francisci | Nov. 22, 1955 |
| 2,785,793 | Murphy et al. | Mar. 19, 1957 |